United States Patent [19]

Noguchi et al.

[11] Patent Number: 4,495,299

[45] Date of Patent: Jan. 22, 1985

[54] THALLIUM-CONTAINING OPTICAL GLASS COMPOSITION

[75] Inventors: Yukio Noguchi, Toyonaka; Takashi Yamagishi, Itami, both of Japan

[73] Assignee: Nippon Sheet Glass Co., Ltd., Osaka, Japan

[21] Appl. No.: 529,874

[22] Filed: Sep. 6, 1983

[30] Foreign Application Priority Data

Sep. 14, 1982 [JP] Japan ................. 57-160212

[51] Int. Cl.$^3$ .................. C03C 3/04; C03C 3/08; C03C 3/10; C03C 3/30
[52] U.S. Cl. .................. 501/72; 501/60; 501/61; 501/62; 501/65; 501/66; 501/67; 501/68; 501/69; 501/70; 501/79; 501/901; 501/903; 350/413
[58] Field of Search .................. 501/65–69, 501/70, 72, 79, 901, 903, 60, 61, 62; 350/413

[56] References Cited

U.S. PATENT DOCUMENTS

| | | | |
|---|---|---|---|
| 3,843,228 | 10/1974 | Yoshiyagawa et al. | 501/37 |
| 3,859,103 | 1/1975 | Yoshiyagawa et al. | 501/37 |
| 3,941,474 | 3/1976 | Kitano et al. | 65/3.14 |
| 4,177,319 | 12/1979 | Jahn | 501/900 |

*Primary Examiner*—Mark Bell
*Attorney, Agent, or Firm*—Wenderoth, Lind & Ponack

[57] ABSTRACT

A thallium-containing optical glass composition which contains the following oxides in the indicated proportions in mole %:

| | |
|---|---|
| $SiO_2$ | 35–80 |
| $Tl_2O$ | 4–26 |
| $Tl_2O + R_2O$ | 8–42 |
| (in which R is an alkali metal) | |
| ZnO | 6–26 |
| $ZrO_2$ | 0–2 |
| $Al_2O_3$ | 0–8 |
| SnO and/or $SnO_2$ | 0–5 |
| $B_2O_3$ | 0–less than 10 | and satisfies the following relations:

$0 \leq K_2O \leq 10$ $4 \leq Na_2O + Li_2O \leq 26$ $0.1 \leq ZrO_2 + Al_2O_3 + SnO \text{ and/or } SnO_2 \leq 8$ $$0.18 \leq \frac{Na_2O + Li_2O}{Tl_2O} \leq 5.50.$$

12 Claims, No Drawings

THALLIUM-CONTAINING OPTICAL GLASS COMPOSITION

This invention relates to a thallium-containing optical glass composition suitable for production of a light-transmitting body, particularly a lens whose refractive index gradient decreases continuously, and preferably parabolically, in a radially outward direction from its axis.

It has already been known that a glass cylinder whose refractive index distribution continuously, and preferably parabolically, decreases radially outwardly from its axis exhibits the action of a lens like a single concave lens or a combination thereof (see U.S. Pat. No. 3,941,474).

In the present specification and the appended claims, a lens which shows such a refractive index distribution as above stated is referred to as a "lens having a refractive index gradient".

The preferred refractive index distribution of a lens having a refractive index gradient is that in a section of the lens taken at right angles to its axis, the refractive index N at a distance r from its center in the radial direction is substantially given by the following equation $$N = N_o(1 - ar^2) \tag{1}$$

where $N_o$ is the refractive index of the lens at its center, r is the distance from the center of the lens in the radial direction, and a is a positive constant.

In regard to a method of producing lenses having a refractive index gradient, U.S. Pat. No. 3,859,103 discloses that a glass rod or fiber having a desired refractive index gradient is obtained by contacting a glass rod or fiber containing thallium with a source of an alkali metal ion, such as a molten salt of sodium or potassium to exchange the thallium ion in a portion nearer to its surface with a larger amount of an alkali metal ion. This U.S. patent discloses a matrix glass composition suitable for the production of such a lens having a refractive index gradient which comprises 50 to 70 mole% of $SiO_2$, 10 to 30 mole% of $B_2O_3$ and 1 to 25 mole% of $Tl_2O$ as main components, more specifically a composition comprising 51.0 mole% of $SiO_2$, 11.0 mole% of $B_2O_3$, 17.8 mole% of $Tl_2O$, 3.2 mole% of $Na_2O$, 12.0 mole% of ZnO and 5.0 mole% of $K_2O$. This U.S. patent states that a lens having a refractive index gradient, i.e. a lens whose refractive index continuously decreases radially outwardly from the axis of a cylindrical glass rod, is produced by molding the aforesaid glass composition into a cylindrical glass rod 1.0 mm in diameter, and dipping the glass rod in a bath of molten potassium nitrate ($KNO_3$) maintained at a temperature at which the viscosity of the glass is about $10^{10}$ poises, for a long period of time, for example for 220 hours, to exchange the thallium ion in the glass rod with a potassium ion, whereby a refractive index distribution represented by equation (1) above is produced in the inside of the glass rod. According to the above-cited U.S. patent, the resulting lens having a refractive index gradient has an aperture angle of 75 degrees.

In the present application, the term "aperture angle" is used to mean that angle of a lens which is a limit of the breadth of the actual visual field of the lens. The aperture angle is represented by $2\theta c$ which is twice the critical angle $\theta c$ of an incident light ray which collides with the side face of a lens, the light ray falling obliquely from the air upon the axis of the end surface of the lens while crossing the axis at an angle of $\theta c$. When the length of the lens is equal to, or larger than, $\theta/2\sqrt{2a}$ (where a is a positive constant as in equation (1)), the aperture angle $2\theta c$ is given by the following equation $$2\theta c = 2\sin^{-1}\sqrt{2N_o \cdot \Delta N} \tag{2}$$

where $\Delta N$ is the difference between the refractive index $N_o$ at the axis of the lens and the refractive index $N_1$ at the radially outward peripheral surface of the lens.

Conventional lenses having a refractive index gradient produced, for example, by the method disclosed in the above-cited U.S. patent, having the defect that during the ion exchange step, their surfaces undergo corrosion by molten salts such as potassium nitrate, and a devitrified product forms, or at times, the entire glass is crystallized, on the surface of the glass owing to slight variations in the composition of the matrix glass or variations in the composition of the molten salt.

Such devitrification or corrosion on the glass surface results in a reduction in the mechanical strength of lenses produced from the glass, or causes narrowing of the visual fields of the lenses.

On the other hand, possible uses of lenses having a refractive index gradient are, for example, in detecting devices in video disks and digital audio discs, devices for observing optical images, and various devices for optical communication. For use in these applications, it is strongly desired to develop lenses having a refractive index gradient which have a very small diameter (generally 3 mm or less) and a large aperture angle (at least 40 degrees, preferably at least 80 degrees).

In order to obtain a lens having a refractive index gradient which has a larger aperture angle, it is theoretically necessary to increase the $2N_o \cdot \Delta N$ on the right side of equation (2). Actually, however, the $N_o$ value cannot be increased very much, and therefore, the $\Delta N$ value must be increased in order to make the aperture angle ($2\theta c$) larger.

According to the above-cited U.S. Pat. No. 3,859,103, in order to obtain a lens having a refractive index gradient which has an aperture angle of at least 45 degrees, the lens after ion exchange treatment should have a refractive index difference $\Delta N$ of at least about 0.05, and one measure of this is that the amount of $Tl_2O$ of the starting glass composition exceeds 5.5 mole%. Generally, however, a thallium ion is less stable in glass and more volatile than alkali metal ions such as $Na^+$ or $K^+$. Thus, when the melting temperature is relatively high in the preparation of a thallium-containing glass composition, thallium volatilizes vigorously, and it is difficult to obtain a thallium-containing glass composition having a high $Tl_2O$ content and a uniform and high quality. Furthermore, because of its instability, the thallium ion tends to color or devitrify the resulting glass.

$Tl_2O$, therefore, is difficult to handle as a glass component.

If the volatilization of thallium during glass formation is reduced, a thallium-containing glass composition of higher uniformity can be obtained. On the other hand, since the amount of thallium volatilized increases exponentially with a rise in temperature, the decreasing the melting temperature during glass formation is strongly desired in order to obtain a highly uniform thallium-containing glass composition.

In the ion exchange of thallium in the glass with an alkali metal, the temperature of the molten alkali metal salt bath and the time during which the matrix glass is dipped in the molten salt bath are controlled according to the desired refractive index distribution. If the temperature of the molten salt bath is increased, the rate of ion exchange becomes higher. Too high a temperature, however, is undesirable because it will result in softening and deformation of the glass rod to be treated. For this reason, the temperature of the molten alkali metal salt is usually adjusted to a temperature range within which the viscosity of the glass rod is usually about $10^{10}$ to about $10^{13}$ poises. If, however, this temperature is too high, some molten salts may undergo a decomposition reaction to hamper the ion exchange. Accordingly, glass compositions are sought in which the temperature range within which the viscosity of the glass composition is $10^{10}$ to $10^{13}$ poises corresponds substantially to a temperature range suitable for a given alkali metal salt, for example a range of 500° to 650° C. for $KNO_3$.

In the prior art, attempts to obtain lenses having a refractive index gradient and a large aperture angle require the inclusion of much $Tl_2O$. Hence, the coloration, devitrification or non-uniformity of the glass reduces the resolving power of lenses made therefrom, and it is difficult to obtain lenses having a refractive index gradient and a large aperture angle.

It is an object of this invention therefore to provide a thallium-containing optical glass composition which has resistance to molten alkali metal salts during ion exchange, does not form a devitrified product on the glass surface or crystallize the glass, and therefore is suitable for producing a lens having a refractive index gradient and an aperture angle of at least 40 degrees, in which the resolving power is not reduced by the coloration, devitrification or non-uniformity of the glass.

Investigations of the present inventors have shown that a thallium-containing optical glass composition which in addition to a thallium ion, contains an alkali ion, such as a sodium ion and/or a lithium ion, capable of diffusing more easily in the glass than the thallium ion (i.e. has a higher coefficient of self diffusion), in a certain specified proportion that satisfies $$0.18 \leq \frac{Na_2O + Li_2O}{Tl_2O} \leq 5.5 \text{ (mole ratio)},$$

gives a lens having a refractive index gradient which has a larger aperture angle than a lens from a conventional similar glass composition containing the same number of moles of $Tl_2O$ when subjected to ion-exchange treatment with a thallium and an alkali metal salt other than the sodium and/or lithium, such as potassium nitrate.

Thus, according to this invention, there is provided a thallium-containing optical glass composition which contains the following oxides in the indicated proportions in mole%:

| | |
|---|---|
| $SiO_2$ | 35–80 |
| $Tl_2O$ | 4–26 |
| $Tl_2O + R_2O$ | 8–42 |
| (in which R is an alkali metal) | |
| ZnO | 6–26 |
| $ZrO_2$ | 0–2 |
| $Al_2O_3$ | 0–8 |
| SnO and/or $SnO_2$ | 0–5 |

-continued

| | |
|---|---|
| $B_2O_3$ | 0–less than 10 | and satisfies the following relationship $$0 \leq K_2O \leq 10$$

$$4 \leq Na_2O + Li_2O \leq 26$$

$$0.1 \leq ZrO_2 + Al_2O_3 + SnO \text{ and/or } SnO_2 \leq 8$$

$$0.18 \leq \frac{Na_2O + Li_2O}{Tl_2O} \leq 5.50.$$

The glass composition of this invention can give a lens having a refractive index gradient and an aperture angle equal to, or larger than, a conventional glass composition of a similar chemical composition even when it has a lower $Tl_2O$ content than the conventional glass composition.

Furthermore, by using the glass composition of this invention, it is possible to easily obtain a lens having a refractive index gradient and a very large aperture angle of, for example, at least 80 degrees without deterioration in its resolving power owing to the coloration, devitrification or non-uniformity of the glass.

The glass composition of this invention can give a lens having a refractive index gradient and an aperture angle of at least 40 degrees, which has resistance to molten salts in the ion exchange step, does not form a devitrified product on the glass surface nor crystallize the glass, and does not undergo a deterioration in resolving power owing to the coloration, devitrification or non-uniformity.

In the above glass composition, $SiO_2$ is used as a glass-forming component, and its proportion is 35 to 80 mole%, preferably 45 to 70 mole%, based on the entire glass composition. If the proportion is less than the specified lower limit, the resulting glass decreases in durability and stability. If it exceeds the upper limit specified, the melting temperature of the glass increases, or the required amounts of the other components cannot be secured, leading to a failure to achieve the objects of this invention. The most suitable proportion of $SiO_2$ is 50 to 65 mole%.

$Tl_2O$ is included in a proportion of 4 to 26 mole%, preferably 6 to 20 mole%. If the amount of $Tl_2O$ is less than the specified lower limit, the desired aperture angle cannot be achieved. If it exceeds the upper limit, the resulting glass has reduced durability and its coloration becomes heavy. The most preferred range of the $Tl_2O$ content is 8 to 18 mole%.

($Tl_2O + R_2O$) are included in an amount of 8 to 42 mole%, preferably 15 to 30 mole%, more preferably 18 to 20 mole%. Use of ($Tl_2O + R_2O$) in an amount smaller than the lower limit specified above cannot give a lens having the desired broad aperture angle, and the melting temperature of the glass composition increases. Furthermore, if the amount of ($Tl_2O + R_2O$) exceeds the specified upper limit, the melting temperature of the glass composition decreases and it is easy to melt the glass composition. However, the durability and devitrification resistance of the glass are abruptly deteriorated, and the glass composition is not practical.

In the glass composition of this invention, the inclusion of a Na ion and/or a Li ion as the alkali metal R is essential. In this case, $Na_2O$ and $Li_2O$ are included in a total amount of 4 to 26 mole%, preferably 4 to 24 mole%, more preferably 5 to 18 mole%. In addition, the contents of $Na_2O$ and $LiO_2$ should be controlled such that the mole ratio of $(Na_2O+Li_2O)$ to $Tl_2O$ is within the range of from 0.18 to 5.50, preferably from 0.20 to 4.0, more preferably from 0.28 to 2.25.

Generally, when the total amount of $Na_2O$ and $Li_2O$ is increased for a fixed amount of $Tl_2O$, the aperture angle of the resulting lens increases and its aberration also increases.

Furthermore, an increase in the mole ratio of $(Na_2O+Li_2O)$ to $Tl_2O$ means an increase in the total amount of $Tl_2O+R_2O$ in the glass, and tends to increase the devitrification of the glass and to reduce its durability.

Accordingly, if the ratio $(Na_2O+Li_2O)/Tl_2O$ is less than 0.18, a glass composition cannot be obtained which gives a lens of the refractive index gradient type having a desired large aperture angle. Conversely, if it exceeds 5.5, a lens produced from the resulting glass composition has an aberration beyond a tolerable range. If the total amount of $Na_2O$ and $Li_2O$ is less than 4 mole%, the melting temperature of the glass increases. If it exceeds 26 mole%, the devitrification of the glass increases and its durability is reduced. Moreover, when the glass is subjected to ion exchange treatment by immersing it in a molten salt bath, cracks tend to form in the glass. Thus, the total amount of $Na_2O$ and $Li_2O$ should be selected by considering both the total proportion (mole%) of these components in the glass composition and the mole ratio of these to $Tl_2O$.

$Li_2O$ and $Na_2O$ may be used singly or in combination. Since, however, $Li_2O$ generally tends to affect the devitrifying property of glass, $Li_2O$ is preferred to $Na_2O$ when they are to be used singly. When they are to be used in combination, it is convenient to include $Na_2O$ in a larger proportion.

As $R_2O$, other alkali metal oxides than $Na_2O$ and $Li_2O$ may be included as required. From the viewpoint of the cost of production (in view of devitrification resistance, durability, etc.), $K_2O$ and $Cs_2O$, especially the former, are suitable as the other alkali metal oxides $R_2O$. $K_2O$ can be included in a proportion of not more than 10 mole%, preferably 0 to 5 mole%, more preferably 0 to 3 mole%, provided that the total amount of $Tl_2O$ and $R_2O$ is within the range of 8 to 42 mole%. Since $K_2O$ tends to reduce the aperture angle of the resulting lens, it should not be used in too large an amount.

ZnO is included in a proportion of 6 to 26 mole%, preferably 6 to 24 mole%, more preferably 8 to 20 mole%. ZnO broadens the glass-forming range of the composition, lowers the melting temperature, reduces devitrification and increases durability. If it is used in an amount of more than 26 mole%, high temperatures are required in ion-exchanging the resulting glass composition, and the durability of the glass is reduced. On the other hand, if the proportion of ZnO is less than 6 mole%, the vitrification of the glass increases and its durability is reduced.

By using small amounts of $ZrO_2$, $Al_2O_3$ and SnO and/or $SnO_2$ either singly or in combination, the resistance of the glass composition to a molten alkali metal salt during ion exchange treatment is markedly increased, and the weatherability of the glass obtained after treatment with the molten alkali metal salt can be increased.

The amount of $ZrO_2$ should be limited to not more than 2 mole%, preferably 0.3 to 1.5 mole%, more preferably 0.5 to 1 mole%. If the content of $ZrO_2$ exceeds 2 mole%, the glass tends to remain non-melted.

If $Al_2O_3$ is included in too large an amount, the meltability of the glass composition is reduced. Hence, its amount is limited to 8 mole% at most, preferably not more than 5 mole%, more preferably not more than 3 mole%.

The content of SnO and/or $SnO_2$ should be limited to not more than 5 mole%, preferably not more than 3 mole %, more preferably not more than 2 mole%. If the content exceeds 5 mole %, the glass tends to be devitrified and colored.

If the total amount of $ZrO_2+Al_2O_3+SnO$ and/or $SnO_2$ is too large. The meltability of the glass is degraded or its coloration becomes remarkable. In the glass composition of this invention, the total amount of $ZrO_2+Al_2O_3+SnO$ and/or $SnO_2$ should be limited to the range of 0.1 to 8 mole %, preferably 0.3 to 5 mole %, more preferably 0.5 to 3 mole %.

$B_2O_3$ is included in an amount of 0 to 10 mole%. The presence of $B_2O_3$ makes it easy to melt the glass. But if it is present in an amount of more than 10 mole %, it volatilizes to cause formation of striae and facilitates volatilization of $Tl_2O$. Furthermore, it tends to cause devitrification during ion exchange, and tends to reduce the aperture angle of the resulting lens. Accordingly, its upper limit should be as specified above. The preferred content of $B_2O_3$ is 0 to 5 mole %, more preferably 0 to 3 mole %.

As shown in Examples given hereinbelow, the above components of the glass composition provided by this invention together exhibit superior performance, especially when the glass composition is formed into a lens of the refractive index gradient type having a large aperture angle.

Investigations of the present inventors have also shown that the glass composition of this invention may contain at least one of the following additional components in the proportions indicated, as required.

$GeO_2$ may be included in a proportion of 0 to 30 mole %. $GeO_2$ has an effect of broadening the glass-forming range of the glass composition of this invention and lowering its melting temperature. If the content of $GeO_2$ exceeds 30 mole%, evaporation of $GeO_2$ becomes remarkable, and homogeneous glass is difficult to obtain. The preferred content of $GeO_2$ is 3 to 15 mole %, especially 4 to 8 mole %.

$TiO_2$ is included in an amount of not more than 20 mole %. $TiO_2$ lowers the melting temperature of the glass composition and broadens its glass-forming range. If it exceeds the above-specified upper limit, devitrification of the glass tends to occur, and the glass is markedly colored.

The preferred content of $TiO_2$ is 3 to 15 mole %, preferably 4 to 8 mole %. MgO is included in an amount of not more than 20 mole %. MgO is effective for broadening the glass-forming range of the glass composition of this invention. If its content exceeds the above-specified upper limit, the melting temperature and melt viscosity of the glass increase. The preferred content of MgO is 5 to 15 mole %, particularly 8 to 12 mole %.

BaO, CaO, SrO and PbO may be included either singly or in combination of two or more in a total amount of not more than 10 mole %. These oxides are used in order to broaden the glass-forming range and the solubility of the glass. If they are present in too large amounts, ion exchange of the resulting glass does not easily proceed, and the refractive index distribution of a lens produced from the glass becomes poor. The preferred content of BaO+CaO+SrO+PbO is 0 to 8 mole %, particularly 0 to 5 mole %.

Of course, these additional components do not have to be included at all.

It is also possible to include in the glass composition of this invention $As_2O_3$, $Sb_2O_3$, etc. either singly or in combination as a clarifying agent in an amount of not more than 0.5 mole %.

The glass composition of this invention composed of the aforesaid oxides can be produced by melting a mixture of the aforesaid oxides or the precursors thereof (such as carbonates and nitrates) at a temperature of 1200° C. to 1400° C. by means of an indirect electric heating furnace, a high-frequency heating furnace, a microwave heating furnace, a direct electrical heating furnace, etc.

The thallium-containing glass composition provided by this invention, as will be seen from Examples given hereinbelow, has a relatively low melting temperature (about 1200° to about 1400° C.) for glass formation and is of uniform quality. The temperature of the glass composition at which its viscosity becomes $10^{10}$ to $10^{13}$ poises (i.e., the temperature which becomes a standard for the temperature of a molten alkali metal salt during ion exchange in the production of a lens having a refractive index gradient from the glass composition) is within the range of about 500° C. to about 650° C. which is suitable for the alkali metal salt. Furthermore, the glass composition of this invention has excellent durability to molten alkali metal salts, and excellent resistance to devitrification, and is quite suitable for the production of lenses having a refractive index gradient and a large aperture angle.

A lens having a refractive index gradient can be produced from the glass composition of this invention by, for example, melting the glass composition in a quartz or platinum melting pot, drawing molten glass continuously little by little from a nozzle provided at the bottom of the pot, quenching the molten glass to mold it into a fibrous form, dipping the resulting glass fibers in a molten alkali metal salt for several tens of hours to one hundred and several tens of hours to exchange the ions in the glass with the ions in the molten salt, cutting the ion-exchanged glass fibers to a predetermined length, and polishing both ends of each cut piece into a parallel plane.

Since lenses having a refractive index distribution produced from the glass composition of this invention have a large aperture angle, they are particularly useful in heads for reading optical signals from minute optical information recording media such as digital audiodiscs, videodiscs, light disc memories and light magnetic disc memories. These lenses have a large aperture angle and therefore a small light gathering beam spot diameter. Hence, they can project beams at an accurate site on minute unit information recording areas (such as pits) recorded in the aforesaid media, and can read reflected light signals from the above areas with high accuracy.

Lenses having a refractive index distribution produced from the glass composition of this invention are also useful for converting diffused light rays from minute light-emitting elements such as LED, or from light transmission fibers into parallel rays, or for gathering parallel light rays and causing them to fall upon such devices as light transmission fiber light-receiving elements. In such an application, these lenses can transmit light, which is diffused broadly, with good efficiency and little losses.

The following examples illustrate the thallium-containing optical glass composition of this invention more specifically.

EXAMPLES 1 TO 20 AND COMPARATIVE EXAMPLES 1 AND 2

As sources of the oxides shown in Table 1, the following raw materials containing the metals of the respective oxides were used.

Silica powder, thallium nitrate, lithium carbonate, sodium carbonate, potassium carbonate, cesium nitrate, barium nitrate, titanium oxide, zinc oxide, zirconium oxide, tin oxide, calcium carbonate, basic magnesium carbonate, strontium carbonate, lead oxide, germanium oxide, boric acid, aluminum hydroxide, antimony oxide and arsenic anhydride.

Predetermined amounts as the oxides, shown in Table 1, of these raw materials were weighed and well mixed. The resulting mixture was put in a platinum melting pot and melted in an electric furnace at 1200° to 1450° C.

The molten mixture was well stirred to homogenize the glass, then cast into a mold at 1000° to 1250° C., and annealed to give glasses having the properties shown in Table 1.

In Table 1, the "yield point (° C.)" denotes the temperature which becomes a standard in ion exchange. It is measured by suspending a glass rod having a diameter of 4 mm and a length of 50 mm with one end supported, applying a load of 10 g on its lower end, heating the rod at a rate of 4° C./min., and recording the resulting elongation. The temperature at breakage of the rod is the yield point. Furthermore, at this temperature, the glass usually shows a viscosity of $10^{11}$ to $10^{12}$ poises.

In Table 1, the aperture angle ($\theta c$) is a value on the optical axis of a lens having a refractive index gradient obtained by subjecting the glass to ion-exchange treatment for a predetermined period of time in molten potassium nitrate at a temperature near the yield point.

TABLE 1

| | 1 | 2 | 3 | 4 | 5 | 6 | 7 | 8 | 9 | 10 | 11 |
|---|---|---|---|---|---|---|---|---|---|---|---|
| Glass composition (mole %) | | | | | | | | | | | |
| $SiO_2$ | 60 | 60 | 52 | 75 | 40 | 55 | 52 | 50 | 52 | 56 | 50 |
| $Tl_2O$ | 10 | 5 | 25 | 5 | 8 | 5 | 20 | 10 | 12 | 12 | 8 |
| $Na_2O$ | 10 | 15 | 5 | | 12 | 15 | 16 | 5 | 12 | 8 | 5 |
| $Li_2O$ | | 5 | | 5 | | 10 | 4 | | | 3 | |
| ZnO | 19.5 | 6 | 6 | 14 | 11 | 6 | 7 | 25 | 13 | 12 | 6 |
| $ZrO_2$ | 0.5 | 1 | | 1 | 1 | 1 | 1 | 0.3 | | 1 | 1 |
| $Al_2O_3$ | | | 5 | | 3 | | | | | | |
| $SnO(SnO_2)$ | | | | | | | | | 3 | | |
| $K_2O$ | | | | | | | | | | 8 | |
| $Cs_2O$ | | | | | | | | 4.7 | | | |

TABLE 1-continued

| | | | | | | | | | | | |
|---|---|---|---|---|---|---|---|---|---|---|---|
| $B_2O_3$ | | 7 | | | | | | 5 | 8 | | |
| $GeO_2$ | | | 25 | | | | | | | | |
| $TiO_2$ | | | | | | | | | | | 15 |
| MgO | | 8 | | | | | | | | | 15 |
| BaO | | | | | | | | | | | |
| CaO | | | | | | | | | | | |
| SrO | | | | | | | | | | | |
| PbO | | | | | | 8 | | | | | |
| $(Na_2O + Li_2O)/Tl_2O$ | 1.00 | 4.00 | 0.20 | 1.00 | 1.50 | 5.00 | 1.00 | 0.50 | 1.00 | 0.92 | 0.63 |
| Properties of glass | | | | | | | | | | | |
| Melting point (°C.) | 1300 | 1250 | 1200 | 1450 | 1250 | 1200 | 1200 | 1350 | 1250 | 1220 | 1400 |
| Yield point (°C.) | 529 | 483 | 420 | 607 | 484 | 411 | 402 | 578 | 460 | 485 | 604 |
| Refractive index (nd) | 1.656 | 1.593 | 1.843 | 1.574 | 1.661 | 1.656 | 1.802 | 1.680 | 1.700 | 1.686 | 1.713 |
| Aperture angle ($\theta c$, °) | 37 | 38 | 38 | 25 | 37 | 44 | 67 | 33 | 38 | 43 | 31 |

| | 12 | 13 | 14 | 15 | 16 | 17 | 18 | 19 | 20 | Comp. Ex. 1 | Comp. Ex. 2 |
|---|---|---|---|---|---|---|---|---|---|---|---|
| Glass composition (mole %) | | | | | | | | | | | |
| $SiO_2$ | 65 | 55 | 50 | 60 | 45 | 47 | 50 | 56 | 52 | 56 | 60 |
| $Tl_2O$ | 16 | 18 | 8 | 9.5 | 14 | 16 | 10 | 8 | 6 | 9 | 16 |
| $Na_2O$ | 4 | 10 | 10 | 9 | 7 | 12 | 17 | 16 | 18 | 9 | |
| $Li_2O$ | | | | | 2 | | | | | | |
| ZnO | 6 | 12 | 13 | 14.5 | 11 | 9 | 22 | 16 | 18 | 7 | 20 |
| $ZrO_2$ | 1 | | 1 | 1 | 1 | 1 | 1 | 1 | 1 | | 0.5 |
| $Al_2O_3$ | | 3 | | | 1 | | | | | | |
| $SnO(SnO_2)$ | | 2 | | | 1 | | | | | | |
| $K_2O$ | | | | 2 | | | | | | | 3.5 |
| $Cs_2O$ | | 10 | | | | | | | | | |
| $B_2O_3$ | | | | 4 | | | | 3 | 5 | 19 | |
| $GeO_2$ | | | | | 10 | | | | | | |
| $TiO_2$ | | | | | | 10 | | | | | |
| MgO | | | | | | 5 | | | | | |
| BaO | 8 | | | | | | | | | | |
| CaO | | | 8 | | | | | | | | |
| SrO | | | | | 8 | | | | | | |
| PbO | | | | | | | | | | | |
| $(Na_2O + Li_2O)/Tl_2O$ | 0.25 | 0.56 | 1.25 | 0.95 | 0.64 | 0.75 | 1.70 | 2.00 | 3.00 | 1.00 | 0.00 |
| Properties of glass | | | | | | | | | | | |
| Melting point (°C.) | 1300 | 1250 | 1300 | 1280 | 1250 | 1200 | 1200 | 1200 | 1200 | 1200 | 1300 |
| Yield point (°C.) | 475 | 461 | 533 | 503 | 467 | 437 | 463 | 501 | 518 | 485 | 580 |
| Refractive index (nd) | 1.741 | 1.766 | 1.664 | 1.638 | 1.749 | 1.802 | 1.682 | 1.638 | 1.620 | 1.625 | 1.712 |
| Aperture angle ($\theta c$, °) | 44 | 55 | 34 | 33 | 45 | 55 | 44 | 39 | 38 | 30 | 30 |

Detailed conditions for ion-exchange treatment in the formation of the glass compositions of Examples 1 to 20 and Comparative Examples 1 and 2 into lenses having a refractive index gradient, and the results obtained, are described below.

The glass compositions of Comparative Examples 1 and 2 were each fabricated into a rod having a diameter of 1 mm, and then immersed for 200 and 100 hours, respectively, in a bath of molten potassium nitrate at 484° and 580° C. which are the yields points of these glasses, to perform ion exchange. Thus, lenses having a refractive index gradient were obtained.

Non-treated glass rods having the same glass compositions as in Comparative Examples 1 and 2 were immersed for 200 hours and 100 hours, respectively, in a molten bath of potassium nitrate in which 20 g, per kg of potassium nitrate, of glass had been subjected to ion-exchange treatment under the same conditions as above. It was found that the glass of Comparative Example 1 underwent surface corrosion and a devitrified product partly formed in the inside of the glass. No corrosion or devitrification was seen on the surface of the glass of Comparative Example 2. However, in spite of the fact that it contained 16 mole% of $Tl_2O$, it had the same aperture angle as the glass of Comparative Example 1 which contained 9 mole % of $Tl_2O$.

Separately, the glass compositions obtained in Examples 1 and 17 were each fabricated into a rod having a diameter of 1 mm, and then immersed for 50 hours in a molten bath of potassium nitrate at 529° and 437° C. which are the yield points of these glasses to perform ion-exchange. Thus, lenses having a refractive index gradient were obtained.

Non-treated glass rods having the same glass compositions as in Examples 1 and 17 were immersed in a molten bath of potassium nitrate in which 20 g, per kg of potassium nitrate, of glass had been subjected to ion exchange under the same conditions as above. No corrosion or devitrification was observed at the surfaces of these glass rods.

The lense obtained from the glass composition of Example 1 which had a Tl$_2$O content of 10 mole% had an aperture angle of as large as 37° C. The lens obtained from the composition of Example 17 containing 16 mole % of Tl$_2$O showed a surprisingly large aperture angle of 55°.

The glasses of Examples 11, 14, 5 and 19 contained 8 mole % of Tl$_2$O, and the (Na$_2$O+Li$_2$O)/Tl$_2$O mole ratio was 0.63, 1.25, 1.50 and 2.0, respectively. The resulting lenses had an aperture angle of 31°, 24°, 37° and 39° corresponding to the above mole ratios. These lenses had a larger aperture angle than the glass of Comparative Example 1 containing 9 mole% of Tl$_2$O, and no corrosion and devitrification were observed during the ion-exchange treatment.

The same experiment as above was conducted with regard to the glasses of the other Examples. The results made it clear that these glasses had higher resistance to the molten salt than the glasses of Comparative Examples 1 and 2, no devitrification nor crystallization occurred during the ion-exchange treatment, and that lenses of the refractive index gradient type having a large aperture angle could be obtained.

What we claim is:

1. A thallium-containing optical glass composition which consists essentially of the following oxides in the indicated proportions in mole %:

| | |
|---|---|
| SiO$_2$ | 35–80 |
| Tl$_2$O | 4–26 |
| Tl$_2$O + R$_2$O | 8–42 |
| (in which R is an alkali metal) | |
| ZnO | 6–26 |
| ZrO$_2$ | 0–2 |
| Al$_2$O$_3$ | 0–8 |
| SnO and/or SnO$_2$ | 0–5 |
| B$_2$O$_3$ | 0–8 | and satisfies the following relations:

$0 \leq K_2O \leq 10$ $4 \leq Na_2O + Li_2O \leq 26$ $0.1 \leq ZrO_2 + Al_2O_3 + SnO \text{ and/or } SnO_2 \leq 8$ $$0.18 \leq \frac{Na_2O + Li_2O}{Tl_2O} \leq 5.50.$$

2. The glass composition of claim 1 which contains 6 to 20 mole % of Tl$_2$O.

3. The glass composition of claim 1 wherein the total proportion of Tl$_2$O and R$_2$O is in the range of 15 to 30 mole %.

4. The glass composition of claim 1 wherein the total proportion of Na$_2$O and Li$_2$O is in the range of 4 to 24 mole %.

5. The glass composition of claim 1 wherein the mole ratio of Na$_2$O+Li$_2$O/Tl$_2$O is in the range of 0.20 to 4.0.

6. The glass composition of claim 1 which contains 6 to 24 mole % of ZnO.

7. The glass composition of claim 1 which contains the following oxides in the indicated proportions in mole %:

| | |
|---|---|
| SiO$_2$ | 45–70 |
| Tl$_2$O | 6–20 |
| Tl$_2$O + R$_2$O | 15–30 |
| (in which R is an alkali metal) | |
| ZnO | 6–24 |
| ZrO$_2$ | not more than 1.5 |
| Al$_2$O$_3$ | not more than 5 |
| SnO and/or SnO$_2$ | not more than 3 |
| B$_2$O$_3$ | 0–5 | and satisfies the following relations:

$0 \leq K_2O \leq 5$ $4 \leq Na_2O + LiO_2 \leq 24$ $0.3 \leq ZrO_2 + Al_2O_3 + SnO \text{ and/or } SnO_2 \leq 5$ $$0.20 \leq \frac{Na_2O + LiO_2}{Tl_2O} \leq 4.0.$$

8. The glass composition of claim 1 which further contains at least one of the following oxides in the indicated proportion in mole %:

| | |
|---|---|
| GeO$_2$ | not more than 30 |
| TiO$_2$ | not more than 20 |
| MgO | not more than 20 |
| BaO + CaO + SrO + PbO | not more than 10. |

9. The glass composition of claim 1 which further contains a clarifying agent.

10. The glass composition of claim 9 wherein the clarifying agent is selected from As$_2$O$_3$ and Sb$_2$O$_3$.

11. The glass composition of claim 9 wherein the proportion of the clarifying agent is not more than 0.5 mole %.

12. A lens having a refractive index gradient, at least the central axis of which is made of the glass composition of claim 1.

* * * * *